Aug. 5, 1930.  W. F. HAGEN  1,772,250

ARTIFICIAL FISH LURE

Filed Sept. 11, 1929

Inventor
W. F. Hagen

Patented Aug. 5, 1930

1,772,250

UNITED STATES PATENT OFFICE

WILLIAM F. HAGEN, OF MANITOWOC, WISCONSIN

ARTIFICIAL FISH LURE

Application filed September 11, 1929. Serial No. 391,933.

This invention pertains to artificial fish lures, and more particularly to that type commonly known as plugs or artificial minnows.

The invention has primarily for its object to provide a simple, inexpensive lure of the foregoing character which, due to its action when drawn through the water, provides an exceedingly attractive and tempting lure, which prompts the fish to strike quickly at the most effective portion of the same.

Incidental to the foregoing, a more specific object resides in the provision of an artificial bait comprising a body rotatably mounted upon a shank and provided with impeller blades adjacent its rear end, whereby the body is rapidly rotated when drawn through the water and the fish attracted by the rapidly rotating blades.

With the above and other objects in view which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawing, Figure 1 is an elevation of an artificial fish lure constructed in accordance with the present invention;

Figure 1:
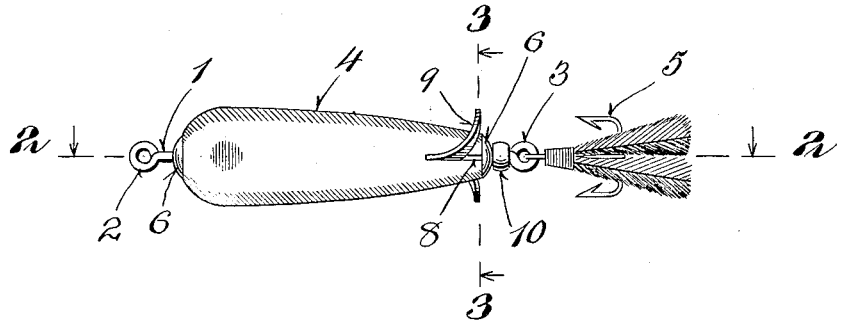

Referring now more particularly to the accompanying drawing, the numeral 1 designates a wire shank provided with an eye 2 at its forward end for attachment to a line in any conventional manner. The rear end of the shank 1 is provided with an eye 3 which cooperates with the eye 2 to retain a plug body 4 on the shank 1, and also carries any form of conventional hook 5.

Figure 2:
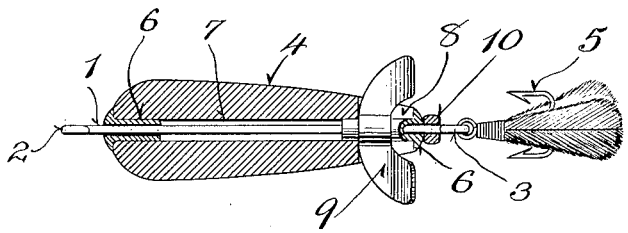
Figure 2 is a longitudinal section taken on the line 2—2 of Figure 1.
Figure 3:
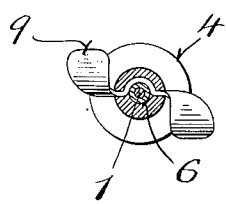
Figure 3 is a transverse section taken on the line 3—3 of Figure 1.

As best seen in Figure 2, the body 4, which is finished in highly contrasting colors, preferably white and a dark color, is rotatably mounted upon the shank by means of a pair of bushing sleeves 6 inserted into the end of a central bore 7, thus affording an inexpensive, but rigid structure. Obviously, any other form of mounting of the plug may be employed without affecting the principle of operation.

Adjacent its rear end, the body 4 is provided with a transverse slot 8 for the reception of the impeller blades 9 projecting upon opposite sides of the body and bent in opposite directions to cause rotation of the body as the lure is drawn through the water.

In assembling, the impeller 9, which is soldered or otherwise secured to the rear bearing sleeve 6, is inserted into the slot 8 with the rear bearing sleeve 6 that snugly fits the bore 7, thus firmly securing the impeller 9 to the body. In order to insure free rotation of the body 4 on the shank 1, a glass collar or bead 10 is positioned upon the shank between the rear bushing 6 and the eye 3.

From the foregoing explanation, it will be readily appreciated that a very simple, inexpensive and attractive lure has been provided which, because of the impellers carried by the rear end of the plug body, will be caused to rapidly rotate as the lure is drawn through the water, and as rotation of the plug body and particularly the impeller which is provided with a high finish, affords considerable attraction, the fish will be prompted to strike at the rear portion of the bait and will be securely hooked by the trailing hook 5.

Particular attention is called to the fact that in assembling the lure, the manufacturing cost is reduced to a minimum in that rivets, screws, and other fastening means are entirely eliminated, it being merely necessary to assemble the various parts on the shank 1 after which either the eye 3 or the eye 2 may be forced, which locks the parts in their assembled positions.

I claim:

An artificial fish lure comprising a shank provided with eyelets at its ends, a body rotatably mounted on said shank and provided with a central longitudinal bore and a transverse slot at its rear end, bearing sleeves inserted into the ends of said bore for the reception of said shank, an impeller surrounding one of said sleeves and positioned in said slot, and a hook carried by the rear eye in said shank.

In testimony that I claim the foregoing I have hereunto set my hand at Manitowoc, in the county of Manitowoc and State of Wisconsin.

W. F. HAGEN.